United States Patent
Calder et al.

(10) Patent No.: US 9,193,466 B2
(45) Date of Patent: Nov. 24, 2015

(54) AIRCRAFT ICE PROTECTION SYSTEM AND METHOD

(71) Applicant: MRA Systems Inc., Baltimore, ME (US)

(72) Inventors: David Patrick Calder, Baltimore, MD (US); Julian Alexander Opificius, Elk River, MN (US); Erik Thomas Pederson, Three Rivers, MI (US); David Cenit Flosdorf, Akron, OH (US)

(73) Assignees: MRA Systems, Inc., Baltimore, MD (US); Kelly Aerospace Thermal Systems, LLC, Willoughby, OH (US)

( * ) Notice: Subject to any disclaimer, the term of this patent is extended or adjusted under 35 U.S.C. 154(b) by 413 days.

(21) Appl. No.: 13/680,177

(22) Filed: Nov. 19, 2012

(65) Prior Publication Data

US 2014/0014640 A1    Jan. 16, 2014

Related U.S. Application Data

(60) Provisional application No. 61/671,218, filed on Jul. 13, 2012.

(51) Int. Cl.
*B64D 15/12*    (2006.01)

(52) U.S. Cl.
CPC ............... *B64D 15/12* (2013.01); *Y10T 156/10* (2015.01); *Y10T 156/1052* (2015.01)

(58) Field of Classification Search
None
See application file for complete search history.

(56) References Cited

U.S. PATENT DOCUMENTS

| | | | | |
|---|---|---|---|---|
| 2,507,018 A * | 5/1950 | Jewett et al. | ................... | 219/205 |
| 2,553,512 A * | 5/1951 | Cotton, Jr | ........................ | 55/306 |
| 2,680,345 A * | 6/1954 | Meadows | ................... | 60/39.093 |
| 2,787,694 A * | 4/1957 | Gordon | ........................ | 219/202 |
| 5,083,423 A * | 1/1992 | Prochaska et al. | ............... | 60/772 |
| 5,427,332 A * | 6/1995 | Rauckhorst et al. | ....... | 244/134 A |
| 5,584,450 A * | 12/1996 | Pisarski | ..................... | 244/134 D |
| 5,925,275 A * | 7/1999 | Lawson et al. | ................ | 219/543 |
| 5,934,617 A * | 8/1999 | Rutherford | ............... | 244/134 E |
| 5,942,140 A * | 8/1999 | Miller et al. | ................... | 219/213 |
| 6,194,685 B1 | 2/2001 | Rutherford | | |
| 6,237,874 B1 * | 5/2001 | Rutherford et al. | ....... | 244/134 E |

(Continued)

FOREIGN PATENT DOCUMENTS

| | | |
|---|---|---|
| EP | 2196393 A1 | 6/2010 |
| GB | 1110217 A | 4/1968 |

(Continued)

OTHER PUBLICATIONS

Search Report from GB Application No. 1312437.5 dated Jan. 13, 2014.

*Primary Examiner* — Timothy Collins
*Assistant Examiner* — Medhat Badawi
(74) *Attorney, Agent, or Firm* — General Electric Company; William S. Munnerlyn

(57) ABSTRACT

A system and method for ice protection of a component, wherein the system is adapted to be adhesively bonded to a surface of the component. The system includes a heating element layer, at least one thermally conductive adhesive layer that adhesively bonds a first side of the heating element layer to the component, an insulation layer, at least one thermally insulating adhesive layer that adhesively bonds a second side of the heating element layer to the insulation layer, an electrical bus bar adapted to provide a connection between a power supply and the heating element layer, and at least one temperature sensor.

13 Claims, 6 Drawing Sheets

(56) References Cited

U.S. PATENT DOCUMENTS

| | | | |
|---|---|---|---|
| 6,279,856 B1 * | 8/2001 | Rutherford et al. | 244/134 E |
| 6,330,986 B1 | 12/2001 | Rutherford et al. | |
| 6,595,742 B2 * | 7/2003 | Scimone | 415/121.2 |
| 7,837,150 B2 * | 11/2010 | Zecca et al. | 244/134 D |
| 8,413,930 B2 * | 4/2013 | Gregory et al. | 244/134 B |
| 9,004,407 B2 * | 4/2015 | Calder et al. | 244/134 D |
| 2002/0182062 A1 * | 12/2002 | Scimone | 415/121.2 |
| 2003/0155467 A1 * | 8/2003 | Petrenko | 244/134 R |
| 2006/0201933 A1 * | 9/2006 | Carpino et al. | 219/545 |
| 2006/0237582 A1 * | 10/2006 | Layland et al. | 244/53 R |
| 2007/0151214 A1 * | 7/2007 | Stelzer et al. | 55/306 |
| 2007/0170312 A1 * | 7/2007 | Al-Khalil | 244/134 A |
| 2007/0210073 A1 * | 9/2007 | Hubert et al. | 219/535 |
| 2009/0242703 A1 * | 10/2009 | Alexander et al. | 244/134 D |
| 2010/0155538 A1 * | 6/2010 | Calder et al. | 244/134 D |
| 2011/0290784 A1 * | 12/2011 | Orawetz et al. | 219/486 |
| 2012/0091276 A1 * | 4/2012 | Al-Khalil | 244/134 A |
| 2014/0014640 A1 * | 1/2014 | Calder et al. | 219/202 |
| 2014/0077039 A1 * | 3/2014 | Scimone | 244/23 B |
| 2014/0224782 A1 * | 8/2014 | Nordman et al. | 219/202 |

FOREIGN PATENT DOCUMENTS

| | | |
|---|---|---|
| GB | 1386792 A | 3/1975 |
| WO | 9515670 A1 | 6/1995 |
| WO | 2013043251 A1 | 3/2013 |

* cited by examiner

AIRCRAFT ICE PROTECTION SYSTEM AND METHOD

CROSS REFERENCE TO RELATED APPLICATIONS

This application claims the benefit of U.S. Provisional Application No. 61/671,218, filed Jul. 13, 2012, the contents of which are incorporated herein by reference.

BACKGROUND OF THE INVENTION

The present invention generally relates to turbomachinery, and more particularly to anti-icing and de-icing systems for aircraft engine surfaces.

FIG. 1 schematically represents a high-bypass turbofan engine 10 of a type known in the art. The engine 10 is schematically represented as including a fan assembly 12 and a core engine 14. The fan assembly 12 is shown as including a composite fan casing 16 and a spinner nose 20 projecting forward from an array of fan blades 18. Both the spinner nose 20 and fan blades 18 are supported by a fan disc (not shown). The core engine 14 is represented as including a high-pressure compressor 22, a combustor 24, a high-pressure turbine 26 and a low-pressure turbine 28. A large portion of the air that enters the fan assembly 12 is bypassed to the rear of the engine 10 to generate additional engine thrust. The bypassed air passes through an annular-shaped bypass duct 30 and exits the duct 30 through a fan nozzle 32. The fan blades 18 are surrounded by a fan nacelle 34 that defines a radially outward boundary of the bypass duct 30, as well as an inlet duct 36 to the engine 10 and the fan nozzle 32. The core engine 14 is surrounded by a core cowl 38 that defines the radially inward boundary of the bypass duct 30, as well as an exhaust nozzle 40 that extends aftward from the core engine 14.

The fan nacelle 34 is an important structural component whose design considerations include aerodynamic criteria as well as the ability to withstand foreign object damage (FOD). For these reasons, it is important to select appropriate constructions, materials and assembly methods when manufacturing the nacelle 34. Various materials and configurations have been considered, with metallic materials and particularly aluminum alloys being widely used. Composite materials have also been considered, such as epoxy laminates reinforced with carbon (graphite) fibers or fabrics, as they offer advantages including the ability to be fabricated as single-piece parts of sufficient size to meet aerodynamic criteria, contour control, and reduced weight, which promote engine efficiency and improve specific fuel consumption (SFC).

Aircraft engine nacelles are subject to icing conditions, particularly the nacelle leading edge at the inlet lip (42 of FIG. 1) while the engine is on the ground and especially under flight conditions. One well known approach to removing ice buildup (de-icing) and preventing ice buildup (anti-icing) on the nacelle inlet lip 42 has been through the use of hot air bleed systems. As an example, engine-supplied bleed air can be drawn from the combustion chamber 24 through piping (not shown) to the inlet lip 42, where the hot bleed air contacts the internal surface of the inlet lip 42 to heat the lip 42 and remove/prevent ice formation. As an alternative, some smaller turboshaft and turboprop aircraft engines have utilized electrical anti-icing systems that convert electrical energy into heat via Joule heating. Resistance-type heater wires can be used as the heating element, though a more recent example uses a flexible graphite material. The heating element is embedded in a boot, such as a silicon rubber, which in turn is attached to the inside leading edge of the nacelle inlet lip 42. A drawback of such systems is that they may require excessive energy for de-icing and continuous anti-icing operation on large aircraft engines, such as high-bypass turbofan engines of the type represented in FIG. 1.

Still other options include "weeping" systems that release chemical de-icing agents, and de-icing boots equipped with inflatable bladders to crack ice buildup. Notable disadvantages of weeping systems include the high cost of chemical de-icing agents, the requirement that the aircraft carry the de-icing agent at all times, and the inoperability of the system if the supply of chemical agent is exhausted during flight. Disadvantages of de-icing boots include the requirement for a pump to inflate the bladders and a relatively short life span.

In view of the above, there are ongoing efforts to develop new technologies capable of providing de-icing and anti-icing functions with improved thermal transfer to the protected surfaces.

BRIEF DESCRIPTION OF THE INVENTION

The present invention provides a system and method for ice protection of aircraft engine surfaces capable of providing de-icing and anti-icing functions (ice protection) with improved heat transfer to the protected surfaces.

According to a first aspect of the invention, a system for ice protection of a component is provided, wherein the system is adapted to be adhesively bonded to a surface of the component and includes a heating element layer, at least one thermally conductive adhesive layer that adhesively bonds a first side of the heating element layer to the component, an insulation layer, at least one thermally insulating adhesive layer that adhesively bonds a second side of the heating element to the insulation layer, an electrical bus bar adapted to provide an electrical connection between a power supply and the heating element layer, and at least one temperature sensor incorporated into the system.

According to a second aspect of the invention, a method of protecting a component on an aircraft from ice formation includes a heating element layer attached to an electrical bus bar and encapsulated with the bus bar and at least one thermal sensor to form a laminated structure, wherein a first thermally conductive adhesive layer is disposed at a first side of the laminated structure and a first thermally insulating adhesive layer is disposed at a second side of the laminated structure. The laminated structure is then cured, after which an insulation layer is attached to the second side of the laminated structure with a second thermally insulating adhesive layer. The laminated structure is then attached to the component with a second thermally conductive adhesive layer. Finally, the laminated structure and adhesive layers are cured to the component to bond the laminated structure to the surface.

A technical effect of this invention is the ability to provide de-icing and anti-icing functions with improved thermal transfer to the protected surface. In particular, it is believed that, by adhesively bonding a first side of a heating element directly to a surface of the component using a high thermal conductivity adhesive and adhesively bonding a second side of the heating element to an insulation layer using a low thermal conductivity adhesive, the thermal transfer will be improved relative to previous systems.

Other aspects and advantages of this invention will be further appreciated from the following detailed description.

DETAILED DESCRIPTION OF THE INVENTION

Figure 1:
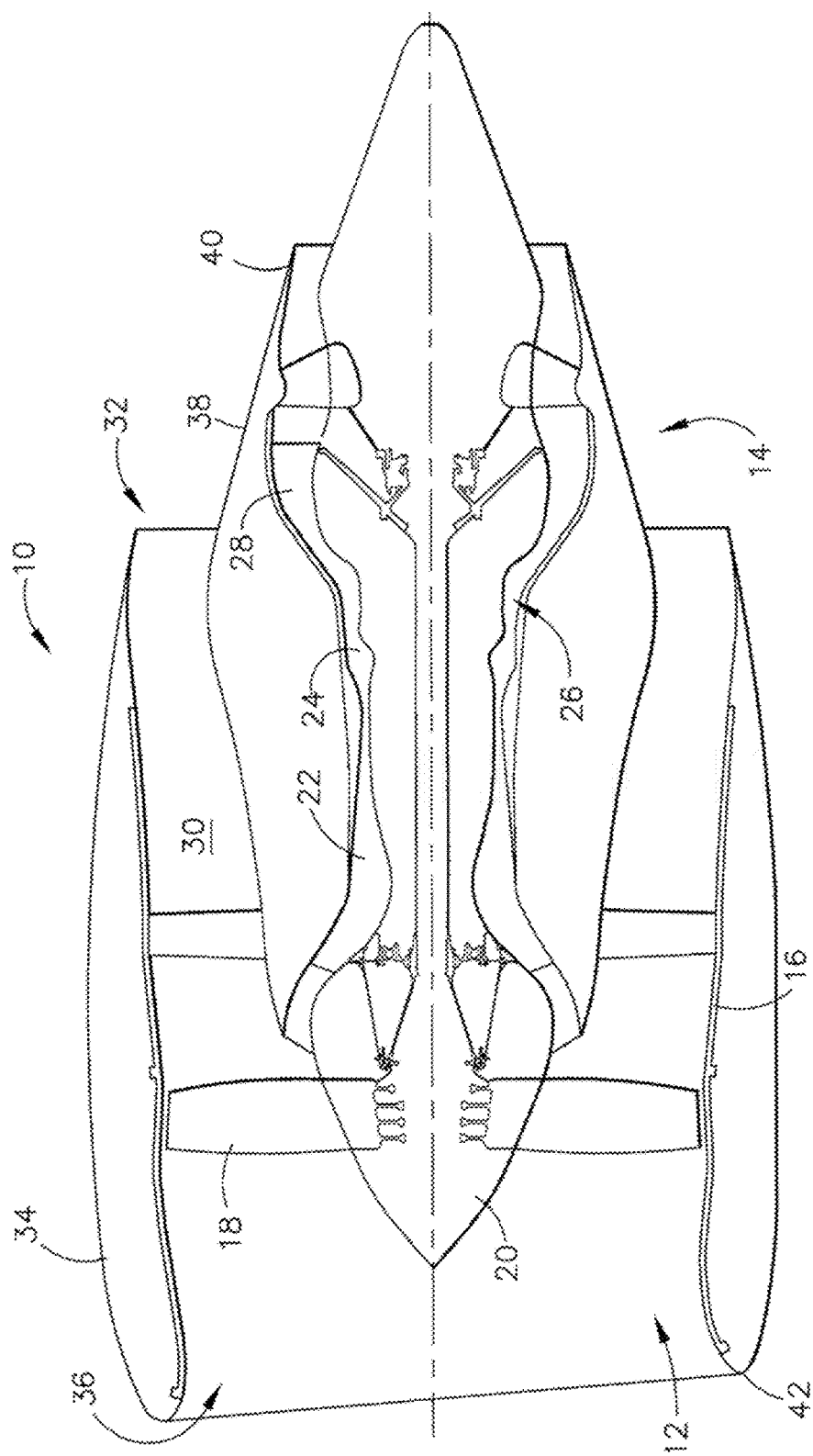
FIG. 1 schematically represents a high-bypass turbofan engine of a type known in the art.

The present invention is generally applicable to components that operate within relatively low temperatures environments that cause the components to be susceptible to detrimental accumulations of ice. While various applications are foreseeable and possible, applications of particular interest include those that require relatively light-weight components, for example, components of aircraft gas turbine engines. Of particular interest are fan nacelles of high-bypass turbofan engines such as represented in, for example, in FIG. 1.

Figure 2:
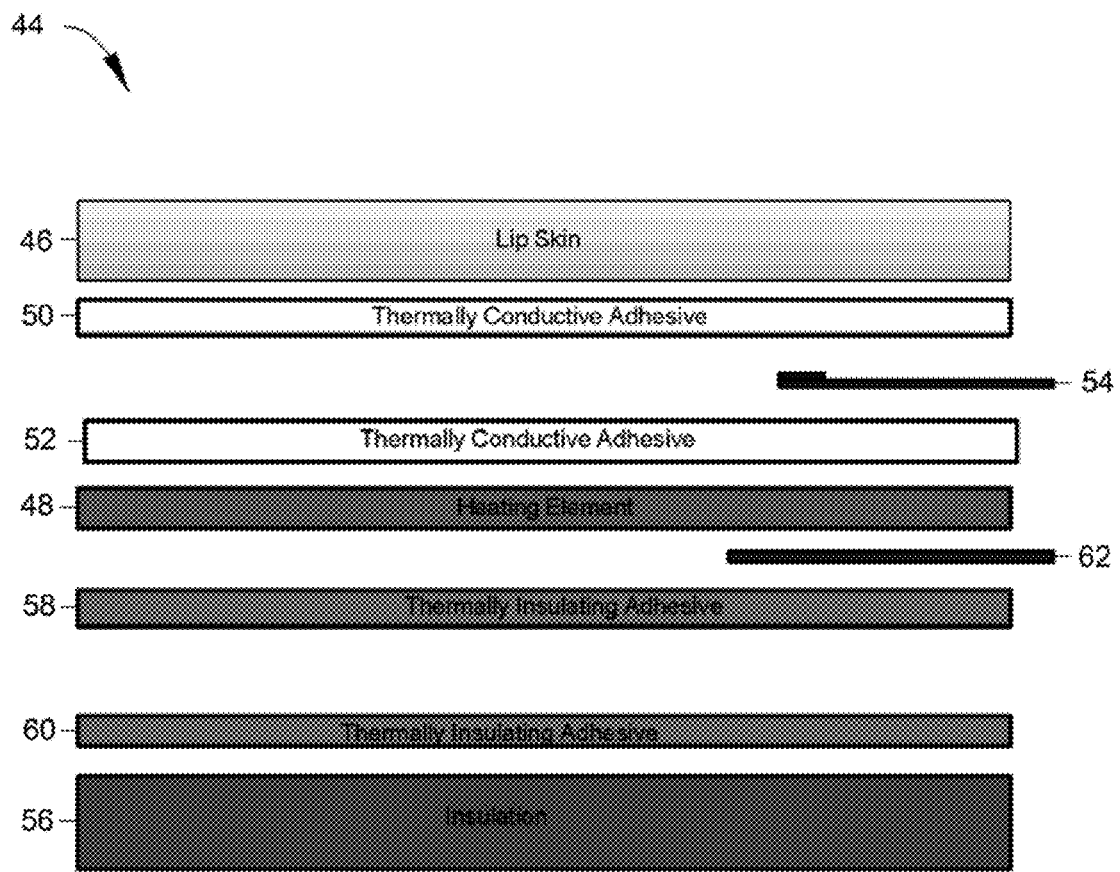
FIG. 2 schematically represents a cross-section of a heating element architecture of an ice protection system in accordance with an embodiment of the present invention.

FIG. 2 represents the cross-section of a heating element architecture 44 suitable for use in ice protection systems, for example, ice protection systems 70 shown in FIG. 3 through 6 in accordance with certain embodiments of the present invention. FIG. 2 also represents a lip skin 46 of a nacelle inlet lip, for example, the inlet lip 42 of FIG. 1. As such, the lip skin 46 is not part of the heating element architecture 44 and is shown only for clarity purposes. Ice is likely to form on the upper surface of the lip skin 46 (as viewed in FIG. 2), which defines the exterior surface of the lip skin 46 that would be in direct contact with the outside environment of the lip 42. In order to remove ice buildup (de-icing) and prevent ice buildup (anti-icing), the lip skin 46 is represented as heated with a heating element 48 of the architecture 44. The heating element 48 is preferably a graphite-based electrically resistive element that preferably weighs less and can be heated more rapidly than traditional metal mesh heating elements, though the use of other similar materials as the heating element 48 is also within the scope of the invention. Particularly, if a graphite-based electrically resistive element is used, the heating element 48 may be of constant thickness and width or have a stepped or tapered width and/or thickness to alter its electrical resistance and hence the watt density throughout the heating element 48. The heating element 48 may be made from any grade of graphite, however higher purity materials are preferred. The graphite may be supported or unsupported, and may include additives such as carbon nano-tubes to enhance through-plane thermal conductivity.

FIG. 2 represents two thermally conductive adhesive layers 50 and 52 as adhering the heating element 48 to the lip skin 46. Although the heating element architecture 44 is represented in FIG. 2 as comprising two thermally conductive adhesive layers 50 and 52, it is within the scope of this invention that any number of thermally conductive adhesive layers may be used. The thermally conductive adhesive layers 50 and 52 may be thin film adhesives, which may be supported or unsupported and are preferably capable of encapsulating the heating element 48 and adhering it to the lip skin 46. The thermally conductive adhesive layers 50 and 52 may contain thermal conductivity-enhancing materials, nonlimiting examples of which include alumina (aluminum oxide), aluminum nitride, silicon carbine, and/or boron nitride. Preferably, the thermally conductive adhesive layers 50 and 52 are capable of achieving a through-plane thermal conductivity of about 3 W/mK or greater, have an operating range of about −70° C. to about 200° C. or greater, and also provide a minimum dielectric resistance of about 4 kilovolts per millimeter or greater.

A temperature sensor 54 is represented as being located between the thermally conductive adhesive layers 50 and 52 in FIG. 2. The temperature sensor 54 may be used to provide feedback to control systems for more accurate operation, fault detection and overheat protection functions. Although FIG. 2 represents a suitable location for the temperature sensor 54, it is within the scope of this invention for the temperature sensor 54 or other/additional temperature sensors to be located elsewhere within or on the architecture 44. The temperature sensor 54 may be a conventional thermocouple or RTD type instrument. Suitable locations of the temperature sensor 54 will be chosen based on the location of the heating element 48 installation as well as temperature data desired for an application and control system.

The lip skin 46, thermally conductive adhesive layers 50 and 52, and temperature sensor 54 define what is referred to herein as a "hot" side of the heating element 48, that is, the side of the heating element 48 wherein heat is intended to be conducted, which in the embodiment of FIG. 2 is towards the exterior surface of the lip skin 46 to provide anti-icing and de-icing for the lip 42. Layers described hereinafter define what is referred to herein as a "cold" side of the heating element 48, that is, an insulated side of the heating element 48 that offers greater resistance to thermal conduction that the layers 50 and 52 of the hot side, which in the embodiment of FIG. 2 is away from the lip skin 46.

As represented in FIG. 2, the cold side of the heating element 48 is insulated by an insulation layer 56. Preferably, this is the primary layer for preventing heat conduction in a direction away from the lip skin 46, although additional layers may provide thermal insulation as well. Suitable types of materials for the insulation layer 56 are well known in the art and will not be discussed herein. With the heating element 48 insulated on its cold side, heat loss is significantly reduced to promote more efficient thermal transfer to the lip 42.

As previously noted, localized watt densities within the heating element 48 can be easily and readily achieved through tailoring the width and/or thickness of the heating element 48, as well as tailoring the layers laminated to the heating element 48. For example, the insulation layer 56 may be formed such that its width and/or thickness varies in any direction, and/or the density may be altered in any direction. Altering these parameters may alter the material resistance and result in varying watt densities across a single heating element 48, providing the ability to tailor the heat input to a specific area of the lip 42. Precise tailoring of watt densities and the rate at which each heating element 48 is able to be thermally cycled allows an ice protection system containing the element 48 to operate more effectively for a given power budget.

The insulation layer 56 is preferably adhered to the heating element 48 by thermally insulating adhesive layers 58 and 60. Although the heating element architecture 44 is represented in FIG. 2 as comprising two thermally insulating adhesive layers 58 and 60, it is within the scope of this invention that any number of thermally insulating adhesive layers may be used. The thermally insulating adhesive layers 58 and 60 may be thin film adhesives, which may be supported or unsupported and are preferably capable of encapsulating the heating element 48 on the cold side. The insulating adhesive layers 58 and 60 may be configured to provide a low thermal conductivity compared to the conductive adhesive layers 50 and 52, for example, preferably about 0.5 W/mK or less. The thermally insulating adhesive layers 58 and 60 also preferably have an operating range of about −70° C. to about 200° C. or greater with a minimum dielectric strength of about 4 kilovolts per millimeter or greater.

An electrical bus bar 62 is represented in FIG. 2 as being located between the heating element 48 and the thermally insulating adhesive layer 58. The electrical bus bar 62 may be attached to the heating element 48 by a mechanical crimping method and/or an electrically conductive bond. The electrical bus bar 62 may be a metal component with high electrical and thermal conductivity, preferably copper or copper-based alloys. The electrical bus bar 62 provides continuity from an electric power supply wire to the heating element 48. The electrical bus bar 62 preferably has integral features for the attachment of the power supply wire, such as a tab for a crimp type connection, or a tab for a ring and screw connection, or any other suitable means.

A preferred method of constructing the heating element architecture 44 includes first crimping or fastening the electrical bus bar 62 to the heating element 48. The heating element 48 and electrical bus bar 62 are then encapsulated with the thermally conducting adhesive layer 52 and thermally insulating adhesive layer 58, and then cured via an oven or autoclave process to form a laminated structure. During this cure, separator films (not shown) on the outer faces of the adhesive layers 52 and 58 are preferably present to facilitate handling of the laminated structure. After removal of the separator films, a secondary cure process is used to bond the laminated structure to the lip skin 46 with the thermally conductive adhesive layer 50 and bond the insulation layer 56 to the laminated structure with the thermally insulating adhesive layer 60.

The heating element architecture 44 described above is capable of providing a higher thermal efficiency with respect to the desired surface to be heated than conventional ice protection systems. This allows the ice protection system to be bonded to the back side of an existing structure, as opposed to being fabricated as an integral part of the existing structure. Attaching the ice protection system to the backside of a structure (opposite the surface that requires heating) allows for easier maintenance access and improves impact damage tolerance.

Figure 3:
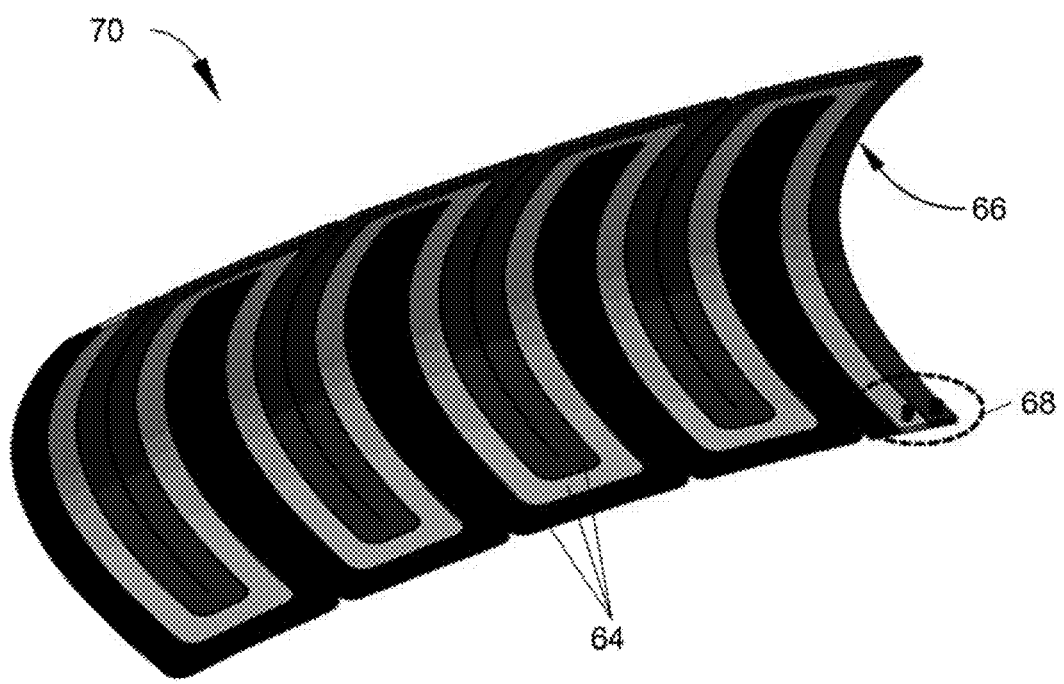
FIG. 3 represents the heating element architecture in the form of strips that have been formed into serpentine shapes to form an anti-ice or de-ice zone of an ice protection system in accordance with an embodiment of the present invention.

FIG. 3 represents an embodiment of the heating element architecture 44 that has been processed (for example, cut) as strips 64 and formed into serpentine shapes to produce an anti-ice or de-ice zone 66 of an ice protection system 70 in accordance with a preferred embodiment of the present invention. Although the zone 66 is represented in FIG. 3 and described herein as comprising three interleaved serpentine shaped strips 64, any number of strips 64 may be used. The strips 64 may be interleaved such that each one of the strips 64 is powered by one phase of a three phase power supply (not shown) and so that each phase of the three phase power may be distributed across an area to be heated for ice protection. Each of the strips 66 may have its own attachment 68 to a power supply harness (not shown). For large aircraft engine inlet installations, the strips 64 are preferably powered by a 3-phase wye source, and can be configured to achieve close phase balance, that is, less than 3%.

Figure 4:
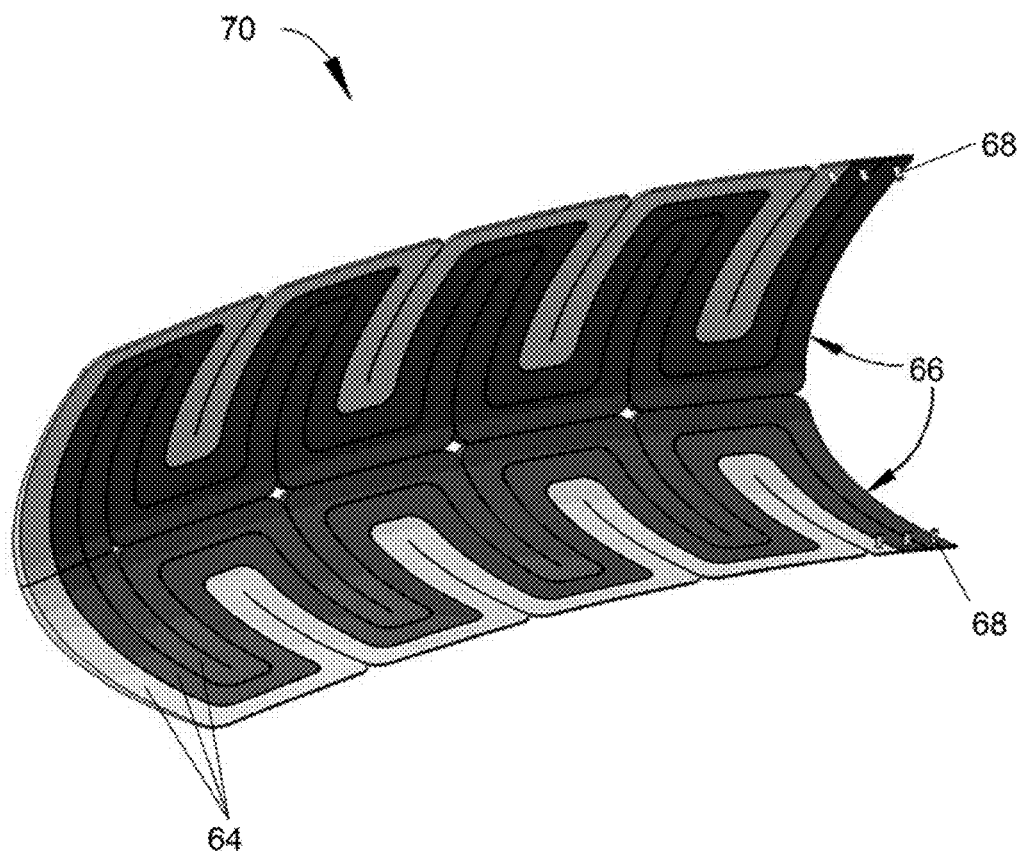
FIG. 4 represents an ice protection system with two distinct zones in accordance with an aspect of the present invention.
Figure 5:
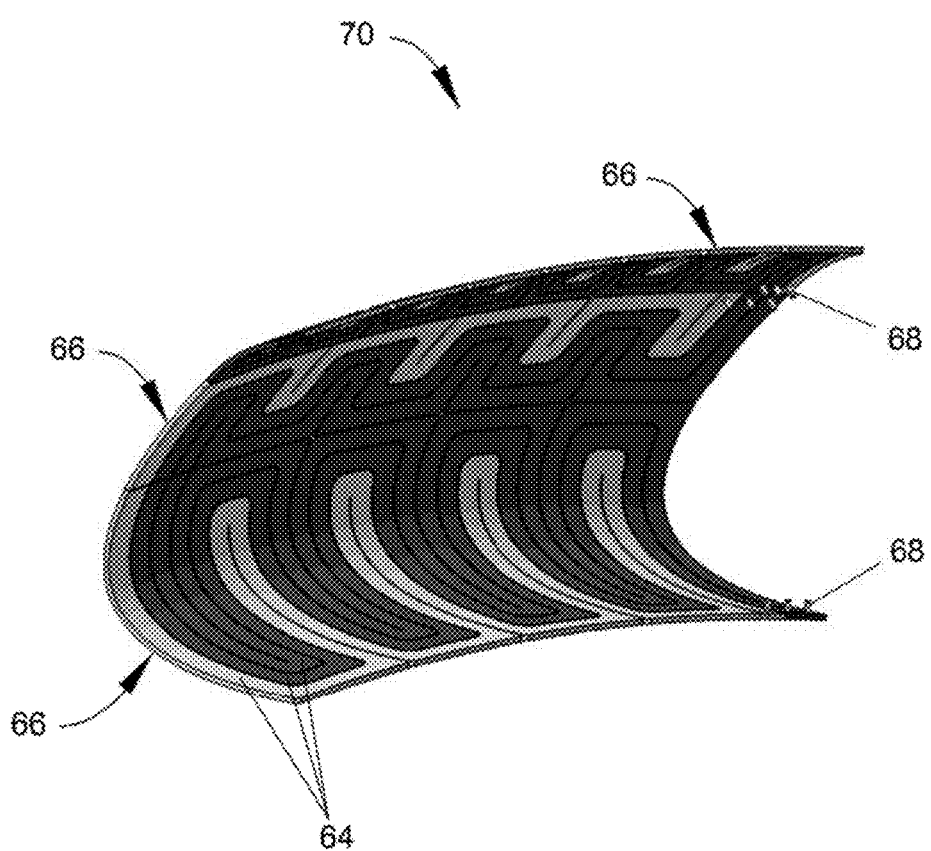
FIG. 5 represents an ice protection system with three distinct zones in accordance with an aspect of the present invention.
Figure 6:
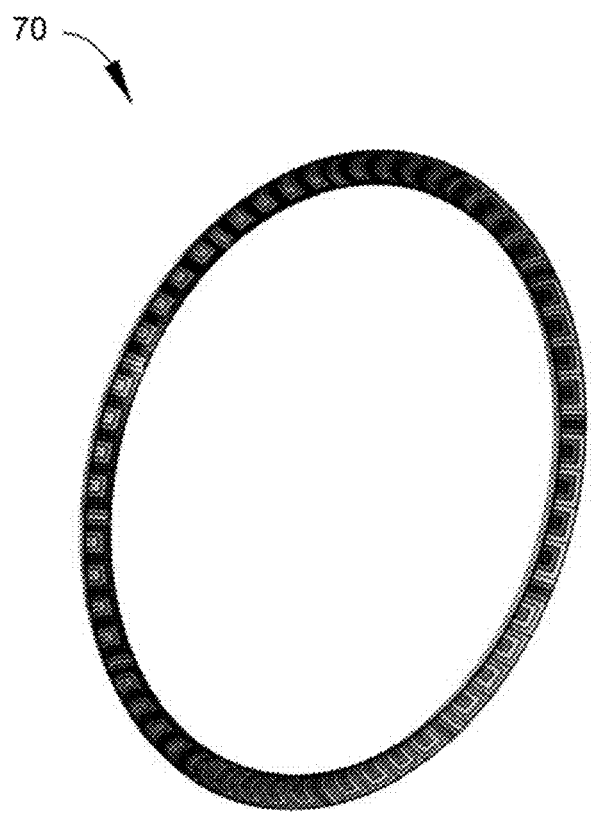
FIG. 6 represents an ice protection system in accordance with an aspect of the present invention.

Multiple zones 66 may be arranged around the lip 42 or another component to be heated. Multiple zones 66 may be arranged to provide anti-ice protection or de-ice capability or some combination thereof. FIG. 4 represents an ice protection system 70 with two distinct zones 66. FIG. 5 represents an ice protection system 70 with three distinct zones 66. Each zone 66 may operate independently from the others. Furthermore, each zone 66 may be configured to perform anti-icing or de-icing functions. FIG. 6 represents an ice protection system capable of fully covering the inlet lip 42 of FIG. 1.

Providing multiple zones 66 provides an additional level of safety for the ice protection system 70. If the ice protection system 70 is graphite-based, localized damage of a single strip 64 of the zone 66 may still allow operation of the damaged strip 64 of the zone 66, although with a localized increase in temperature. If, however, the strip 64 is completely severed to prevent a continuous electrical path, a portion of the strip 64 removed from the power supply may not work. In this situation, or in the event of a failure either through a power supply harness or connector, or in power generation, regulation or control where a single strip 64 fails, two thirds of the ice protection system 70 will still operate. The interleaved serpentine strip 64 arrangement allows sufficient heat transfer by the operable two thirds of the ice protection system 70 to provide de-ice or anti-ice capability.

While the invention has been described in terms of specific embodiments, it is apparent that other forms could be adopted by one skilled in the art. For example, the ice protection system 70 could differ in appearance and construction from the embodiments shown in the Figures, the functions of each component of the ice protection system 70 could be performed by components of different construction but capable of a similar (though not necessarily equivalent) function, and materials other than those noted could be used. Therefore, the scope of the invention is to be limited only by the following claims.

The invention claimed is:

1. A system for ice protection of a component, wherein the system is adapted to be adhesively bonded to a surface of the component, the system comprising:
    a heating element layer;
    at least one thermally conductive adhesive layer that adhesively bonds a first side of the heating element layer to the component;
    an insulation layer;
    at least one thermally insulating adhesive layer that adhesively bonds a second side of the heating element to the insulation layer;
    an electrical bus bar adapted to provide a connection between a power supply and the heating element layer; and,
    at least one temperature sensor incorporated into the system.

2. The system according to claim 1, wherein the insulation layer has a width and thickness and at least one of the width and thickness is not constant.

3. The system according to claim 2, wherein the thickness of the insulation layer is varied.

4. The system according to claim 1, wherein the density of the insulation layer is varied.

5. The system according to claim 1, wherein the watt density varies in the heating element layer.

6. The system according to claim 1, wherein the system comprises at least first and second zones that each comprise the heating element layer, the at least one thermally conductive adhesive layer, the insulation layer, the at least one thermally insulating adhesive layer, and the at least one temperature sensor, and the first and second zones are configured to provide either an anti-icing or a de-icing function independently of each other.

7. The system according to claim 1, wherein the heating element layer is a graphite-based electrically resistive element.

8. The system according to claim 7, wherein the heating element layer has carbon nano-tube additives.

9. The system according to claim 1, wherein the heating element layer, the at least one thermally conductive adhesive layer, the insulation layer, the at least one thermally insulating adhesive layer, and the at least one temperature sensor are in the form of at least two strips.

10. The system according to claim 9, wherein the strips are formed into an interleaved serpentine shape.

11. The system according to claim 9, wherein each of the strips is independently attached to a power supply.

12. The system according to claim 1, wherein the component is part of an aircraft.

13. The system according to claim 12, wherein the component is a nacelle inlet lip.

* * * * *

UNITED STATES PATENT AND TRADEMARK OFFICE
CERTIFICATE OF CORRECTION

| | | |
|---|---|---|
| PATENT NO. | : 9,193,466 B2 | Page 1 of 1 |
| APPLICATION NO. | : 13/680177 | |
| DATED | : November 24, 2015 | |
| INVENTOR(S) | : Calder et al. | |

It is certified that error appears in the above-identified patent and that said Letters Patent is hereby corrected as shown below:

On the title page, item (71), under "Applicant", in Column 1, Line 1, delete "ME (US)" and insert -- MD (US) Kelly Aerospace Thermal Systems, LLC, Willoughby, OH (US) --, therefor.

In the specification,

In Column 5, Line 57, delete "strips 66" and insert -- strips 64 --, therefor.

Signed and Sealed this
Seventeenth Day of May, 2016

Michelle K. Lee
*Director of the United States Patent and Trademark Office*